(12) United States Patent
Nakajima

(10) Patent No.: US 6,289,510 B1
(45) Date of Patent: Sep. 11, 2001

(54) ONLINE PROGRAM-UPDATING SYSTEM AND COMPUTER-READABLE RECORDING MEDIUM STORING A PROGRAM-UPDATING PROGRAM

(75) Inventor: Ryoetsu Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,944

(22) Filed: Sep. 2, 1998

(30) Foreign Application Priority Data

Mar. 12, 1998 (JP) .................................................. 10-061101

(51) Int. Cl.[7] .................................................. G06F 9/445
(52) U.S. Cl. .................................................. 717/11
(58) Field of Search .............................. 717/11; 707/103, 707/203; 709/221

(56) References Cited

U.S. PATENT DOCUMENTS

| | | | |
|---|---|---|---|
| 5,247,683 | * 9/1993 | Holmes et al. | 709/221 |
| 5,408,624 | * 4/1995 | Raasch et al. | 717/11 |
| 5,586,304 | * 12/1996 | Stupek, Jr. et al. | 717/11 |
| 5,623,604 | * 4/1997 | Russell et al. | 717/11 |
| 5,692,183 | * 11/1997 | Hapner et al. | 707/103 |
| 5,734,898 | * 3/1998 | He | 707/203 |
| 5,790,796 | * 8/1998 | Sadowsky | 709/221 |
| 5,815,722 | * 9/1998 | Kalwitz et al. | 717/11 |
| 5,835,911 | * 11/1998 | Nakagawa et al. | 707/203 |
| 5,901,320 | * 5/1999 | Takahashi et al. | 717/11 |

FOREIGN PATENT DOCUMENTS

| | | |
|---|---|---|
| 3-265953 | 11/1991 | (JP) . |
| 4-167139 | 6/1992 | (JP) . |
| 9223022 | 8/1997 | (JP) . |

* cited by examiner

Primary Examiner—Mark R. Powell
Assistant Examiner—Hoang-Vu Antony Nguyen-Ba
(74) Attorney, Agent, or Firm—Helfgott & Karas, P.C.

(57) ABSTRACT

There is provided an online program-updating system which is capable of updating contents of a program without interrupting any services provided by the system. A management information storage section stores management information including operative status flags each indicative of the operative status of a corresponding program module and information of a version number associated with the corresponding program module. A program execution section updates operative status flags based on the operative statuses of the program modules. A version number check section makes a comparison between the version number of each program module of a revised program and that of each program module of the existing program in response to a download request, and determines that an update of the program is required, if the version number of the program module of the revised program is newer. An operative status determination section checks on the operative status flag associated with each program module in the existing program, and determines that the update of the program is permitted, if the program module is an "inactive" operative status. A program transfer section executes download of a program module the update of which is determined to be required and at the same time permitted.

10 Claims, 15 Drawing Sheets

ONLINE PROGRAM-UPDATING SYSTEM AND COMPUTER-READABLE RECORDING MEDIUM STORING A PROGRAM-UPDATING PROGRAM

BACKGROUND OF THE INVENTION

1. Field of the Invention

The present invention relates to an online program-updating system and a computer-readable recording medium storing a program-updating program, and more particularly to an online program-updating system for carrying out an update of a program without stopping operation of a system in which the program is stored and run a computer-readable recording medium storing a program-updating program for the update.

2. Description of the Related Art

As performance of microcomputers has been enhanced, it is possible to replace devices and systems including communication systems, which are conventionally controlled by large scale computers, with small-sized devices and systems controlled by microcomputers. Further, recent development of microprocessors is amazing and the performance and capability thereof are being improved day by day, with more and more devices and systems coming to incorporate microprocessors.

In order to realize desired capabilities through incorporation of a microprocessor, a program for operating the microprocessor is required, and actually, the desired capabilities are realized for the most part through execution of such a program. If contents of various functions are written into a program, addition or modification of a specific function can be carried out simply by rewriting the program. Recently, in accordance with the development of microprocessors, upgrade of an existing function realized by the program or addition of a new function realized by the same is frequently carried out, so that there are very few programs which continue to be run without any version upgrade.

Under such circumstances, a method is employed in which a new version of a program can be downloaded from another system so as to enable frequent modification or upgrade of the program. The download of the new version of the program from one system to a plurality of other systems has made it possible to readily modify the program stored in each of the other systems providing identical functions.

In order to download a program, it is generally required to install dedicated programs (called "loaders" or the like) for use in program transfer, in a system from which the program is downloaded (i.e. a program-providing system which provides a latest version of the program) and a system to which the programs is downloaded (i.e. a program-executing system which runs the program thus provided), respectively. The dedicated program installed in the program-providing system designates the starting address of a storage area in which the program is stored and an amount of data to be transferred for the download of the program, while the dedicated program installed in the program-executing system also designates a storage area in which the program is to be stored. This activates a transfer program to start a predetermined download. In order to check on normality of the download, information on a checksum carried out when the program was created is checked against a checksum of the program executed after download. If the checksum results are identical, it is determined that the program has been normally downloaded.

Programs can be downloaded as described above. However, since it is impossible to rewrite contents of a program during execution of the program, it is required to stop or interrupt operation of a system or a device when the download is carried out for an update of the program, so that the service to be provided by the system or the device is made unavailable to users.

In order to avoid this inconvenience, conventionally, a program is stored in two storage areas, i.e. an actually used area in which a running program is stored and a spare area in which a downloaded program is stored. A new program is downloaded and stored in the spare area, and then the spare area storing the new program and the actually used area are switched in function to change the spare area into the actually used area for execution of the updated program, whereby a time period during which the services are interrupted is reduced.

However, even if the two program storage areas are employed, the services are inevitably interrupted when the actually used area and the spare area are switched to each other. Moreover, various environmental settings are required for activation of a newly downloaded program, and hence it takes a certain time period before the services start to be actually provided.

SUMMARY OF THE INVENTION

It is an object of the present invention to provide an online program-updating system which is capable of updating contents of a program without interrupting any service provided by operation of the program.

It is a further object of the present invention to provide a computer-readable recording medium storing a program-updating program for causing a computer system to execute processing for updating contents of a program without interrupting any service provided through operation of the program.

To attain the above objects, there is provided an online program-updating system for updating contents of a program by downloading a revised program on line. The online program-updating system is characterized by comprising program storage means for storing an existing program to be updated, management information storage means for storing management information including an operative status flag indicative of an operative status of the existing program, program execution means for executing the existing program as required and setting the operative status flag to a state indicative of an active status of the program during execution of the existing program, operative status determination means for monitoring the operative status flag in response to a download request for download of the revised program and permitting execution of the download only when the operative status flag is not set to the status indicative of the active status of the program, and program transfer means for downloading the revised program during a time period over which the download is permitted by the operative status determination means, to thereby replace the existing program stored in the program storage means with the revised program.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENTS

A preferred embodiment of the present invention will be described below with reference to the accompanying drawings.

Figure 1:
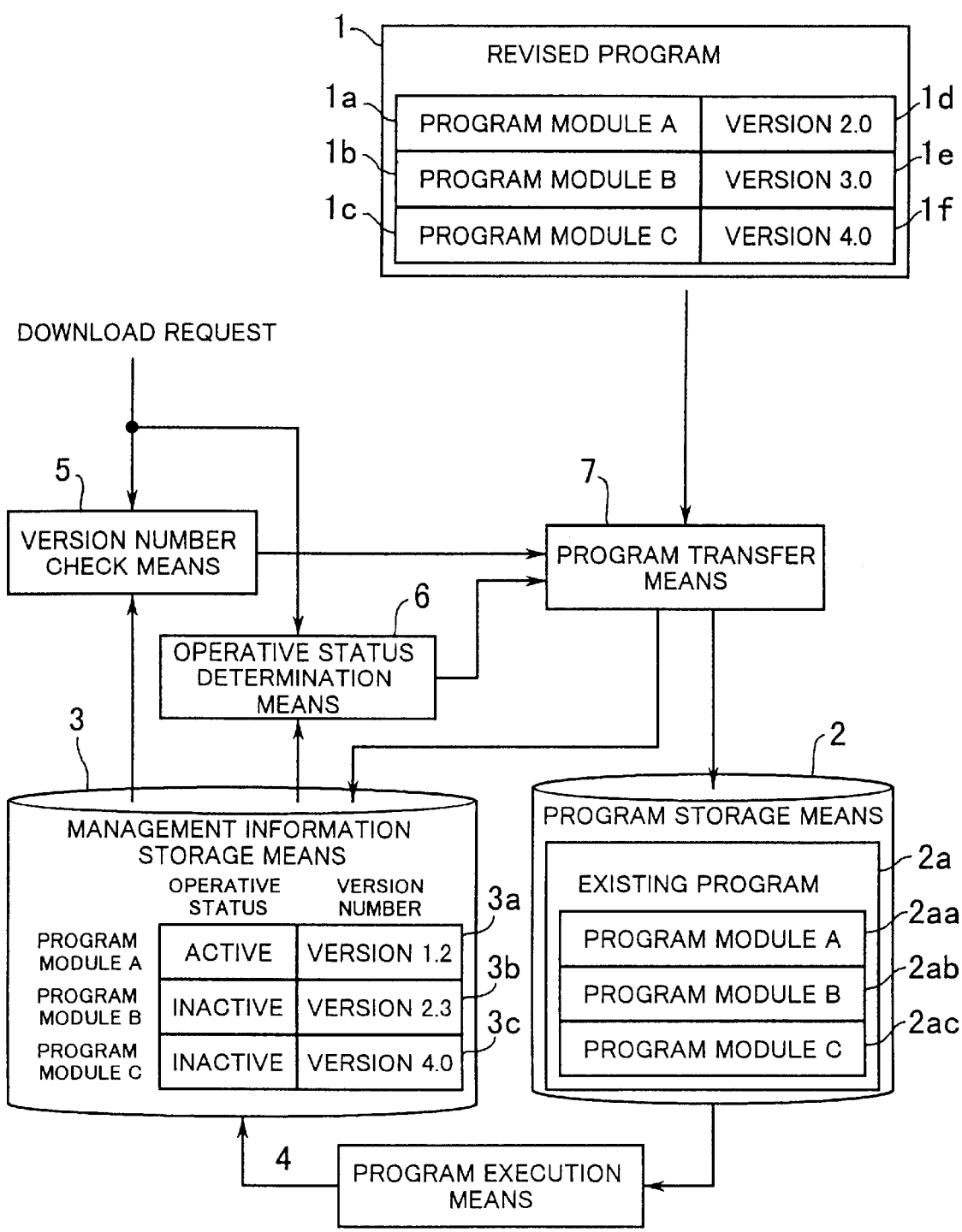
FIG. 1 is a conceptual representation of construction of the present invention.

Referring first to FIG. 1, there are shown the principles of the invention. The invention is comprised of the following component elements.

A revised program 1 includes program modules 1a, 1b, 1c each corresponding to a specific function, and version number information items 1d, 1e, 1f are additionally provided for the respective modules. Program storage means 2 stores an existing program 2a subject to version upgrade. Similarly to the revised program 1, the existing program 2a is divided into program modules 2aa, 2ab, 2ac. Management information storage means 3 stores management information items 3a, 3b, 3c associated with the program modules 2aa, 2ab, 2ac, respectively. Each of the management information items 3a, 3b, 3c includes an operative status flag and a version number information item.

Program execution means 4 executes the program modules 2aa, 2ab, 2ac of the existing program 2a as required, and updates the operative status flags of the respective management information items 3a, 3b, 3c according to the respective operative statuses of the program modules 2aa, 2ab, 2ac. More specifically, when any one of the program modules 2aa, 2ab, 2ac is activated, an operative status flag of a corresponding one of the management information items 3a, 3b, 3c is set to an "active" status, and when the program module is terminated, the flag is set to an "inactive" status.

Version number check means 5 is responsive to a download request, for performing a comparison between a version number information item associated with a desired program module in the revised program 1 and one associated with a corresponding program module in the existing program 2a. If the comparison result shows that the program module in the revised program 1 is newer, it is determined that program update is required, and otherwise, it is determined that program update is not required.

On the other hand, operative status determination means 6 is also responsive to the download request, for determining, through referring to a corresponding one of the operative status flags of the management information items 3a, 3b, 3c, whether or not program update is permitted. If the flag indicates that the corresponding program module is in an "inactive" status, program update is permitted, whereas if the flag indicates that the program module is in an "active" status, program update is inhibited.

When the version number check means 5 determines that program update is required, and when the operative status determination means 6 permits the program update, program transfer means 7 downloads the desired program module from the revised program 1, to thereby replace the identically named program module stored in the program storage means 2 with the downloaded program module. At the same time, the version number information item of a corresponding one of the management information items stored in the management information storage means 3 is replaced with the version number information item of the newly downloaded program module.

In the system described above, the program execution means 4 sequentially executes the program modules within the program storage means 2, to thereby provide a series of services to users.

Figure 2:
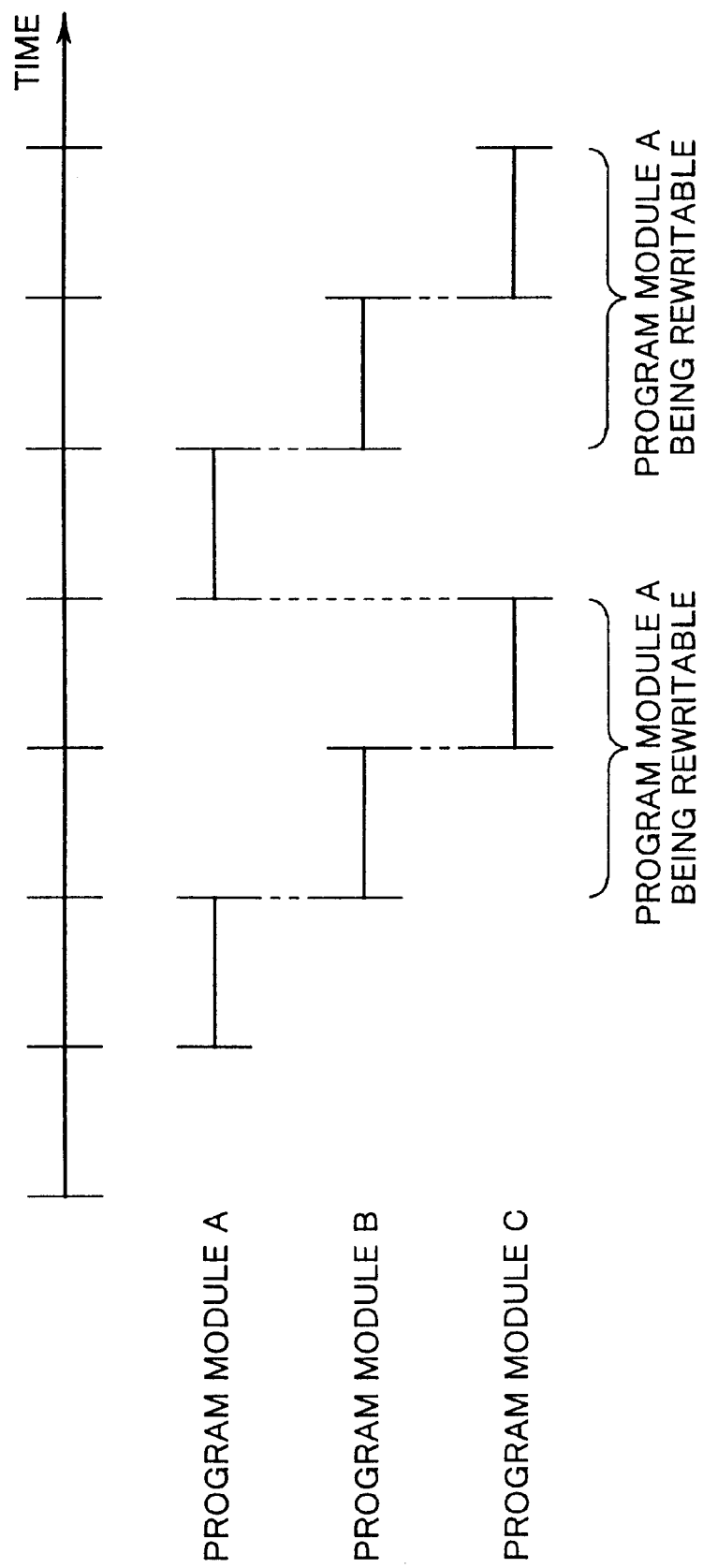
FIG. 2 is a view showing an example of changes in operative status of program modules of a program.

FIG. 2 shows an example of changes, in operative status, of program modules of a program. In the illustrated example, "Program module A", "Program module B", and "Program module C" are executed in the mentioned order. As shown in FIG. 2, during execution of "Program module B" or "Program module C", the operative status flag of "Program module A" indicates that the program module A is "inactive", which means that an update of "Program module A" is permitted. Thus, the update of "Program module A" is permitted so long as "Program module B" or "Program module C" is being run.

Figure 3:
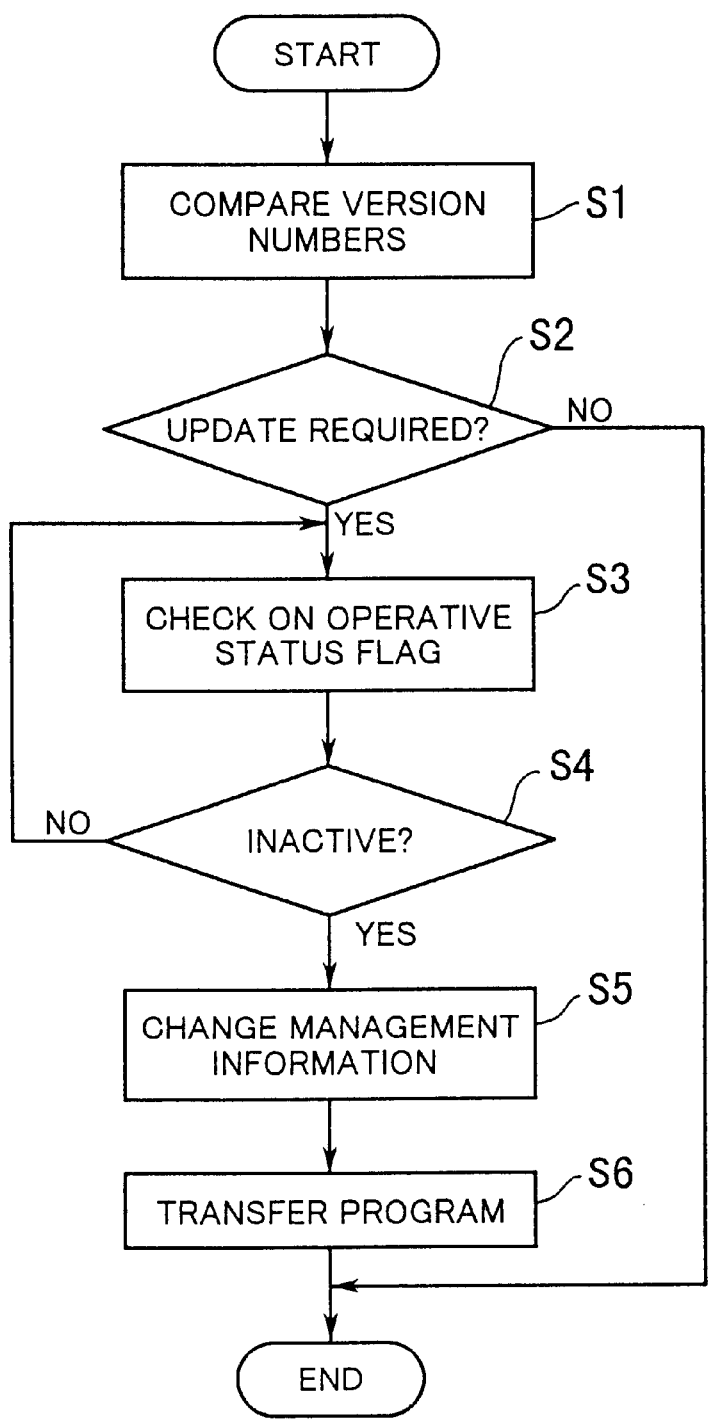
FIG. 3 is a flowchart showing a routine for program update.

FIG. 3 shows a routine for a program update.

(Step S1) The version number check means 5 makes a comparison between the version number information items 1d, 1e, 1f associated respectively with the program modules 1a, 1b, 1c stored in the revised program 1 and the version number information items included in the respective management information items 3a, 3b, 3c.

(Step S2) The version number check means 5 determines whether or not an update is required. More specifically, if any one of the version numbers of the program modules of the revised program 1 is newer, it is determined that the update is required, and otherwise, it is determined that update is not required.

(Step S3) The operative status determination means 6 performs a check on the operative status flag of a program module which requires the update.

(Step S4) If the operative status flag indicates that the program module is "inactive", the program proceeds to Step S5, and otherwise, the program returns to Step S3.

(Step S5) The program transfer means 7 replaces the version number information item of the program module to be updated with that of the program module to be downloaded.

(Step S6) The program transfer means 7 transfers the program module determined to require updating from the revised program 1 to the program storage means 2 to thereby replace the existing program module with the transferred program module.

As described above, an update of each program module is performed during execution of another program, so that it is possible to update the whole program without stopping or interrupting services provided by operation of the program.

Next, an embodiment of the present invention will be described in detail.

Figure 4:
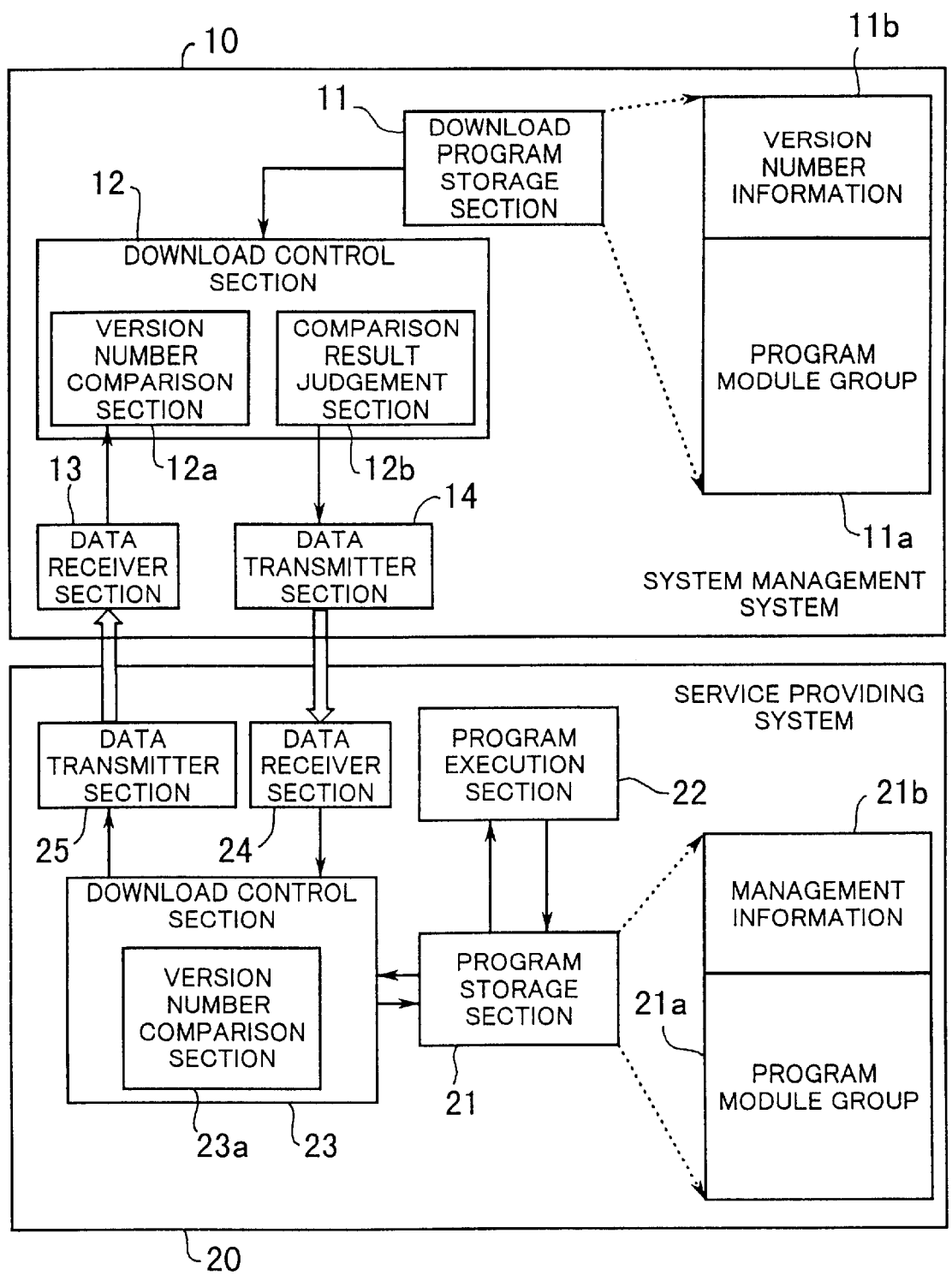
FIG. 4 is a block diagram showing a system configuration according to an embodiment of the present invention.

FIG. 4 shows a system configuration of the embodiment. This system is comprised of a system management system 10 and a service providing system 20.

The system management system 10 includes a download program storage section 11, a download control section 12, a data receiver section 13, and a data transmitter section 14.

The download program storage section 11 stores a program module group 11a formed of program modules for download by the service providing system 20 and version number information items 11b associated with the respective program modules.

The download control section 12 controls processing for distributing program modules stored in the download program storage section 11 to the service providing system 20. The download control section 12 incorporates a version number comparison section 12a and a comparison result judgment section 12b.

The version number comparison section 12a performs a comparison between a version number information item of each program module stored in the service providing system 20, which is received via the data receiver section 13, and a version number information item of a corresponding one of the program modules stored in the download program storage section 11. The comparison result judgment section 12b receives a result of the comparison performed by the version number comparison section 12a and a result of a comparison performed by a version number comparison section 23a within the service providing system 20, and makes a judgment on the comparison results. More specifically, when it Is judged on the basis of the comparison results that any program module stored in the download program storage section 11 is newer, it is determined that the program module should be transferred for download.

When a program module to be downloaded exists within the download program storage section 11, the download control section 12 receives information on an operative status flag associated with a corresponding program module stored in the service providing system 20 via the data receiver section 13, so as to determine whether the corresponding program module is active or inactive. If the program module is inactive, the program module to be downloaded is sent to the data transmitter section 14.

The data receiver section 13 receives version number information, a version number comparison result, and operative status flag information from the service providing system 20 and transfers them to the download control section 12.

The data transmitter section 14 transmits to the service providing system 20 the version number information items of the respective program modules stored in the download program storage section 11 as well as program modules to be downloaded.

The service providing system 20 is comprised of a program storage section 21, a program execution section 22, a download control section 23, a data receiver section 24, and a data transmitter section 25.

The program storage section 21 stores a program module group 21a formed of program modules in each of which the details of processing for providing service is written, and management information 21b on the program modules. The management information 21b includes the version number information items associated with the respective program modules and the operative status flags each of which indicates whether or not a corresponding program module is active (i.e. being executed by the program execution section 22).

The program execution section 22 provides services to users by sequentially executing the program modules stored in the program storage section 21. When a program module is activated, the operative status flag of a corresponding management information item is set to "active". On the other hand, when the program module is terminated, the operative status flag is set to "inactive".

The download control section 23 controls processing for downloading the program modules stored in the program storage section 21. The download control section 23 incorporates the version number comparison section 23a mentioned above. The version number comparison section 23a performs a comparison between a version number information item associated with a program module to be downloaded, which is received from the system management system 10 via the data receiver section 24, and a version number information item associated with a corresponding program module stored in the program storage section 21.

The data receiver section 24 receives version number information and a program module from the system management system 10 and transfers them to the version number comparison section 23a of the download control section 23.

The data transmitter section 25 transmits to the system management system 10 the management information 21b stored in the program storage section 21 and a result of a comparison performed by the version number comparison section 23a.

The program storage section 21 of the service providing system 20 is implemented by part of a memory area within a semiconductor memory.

Figure 5:
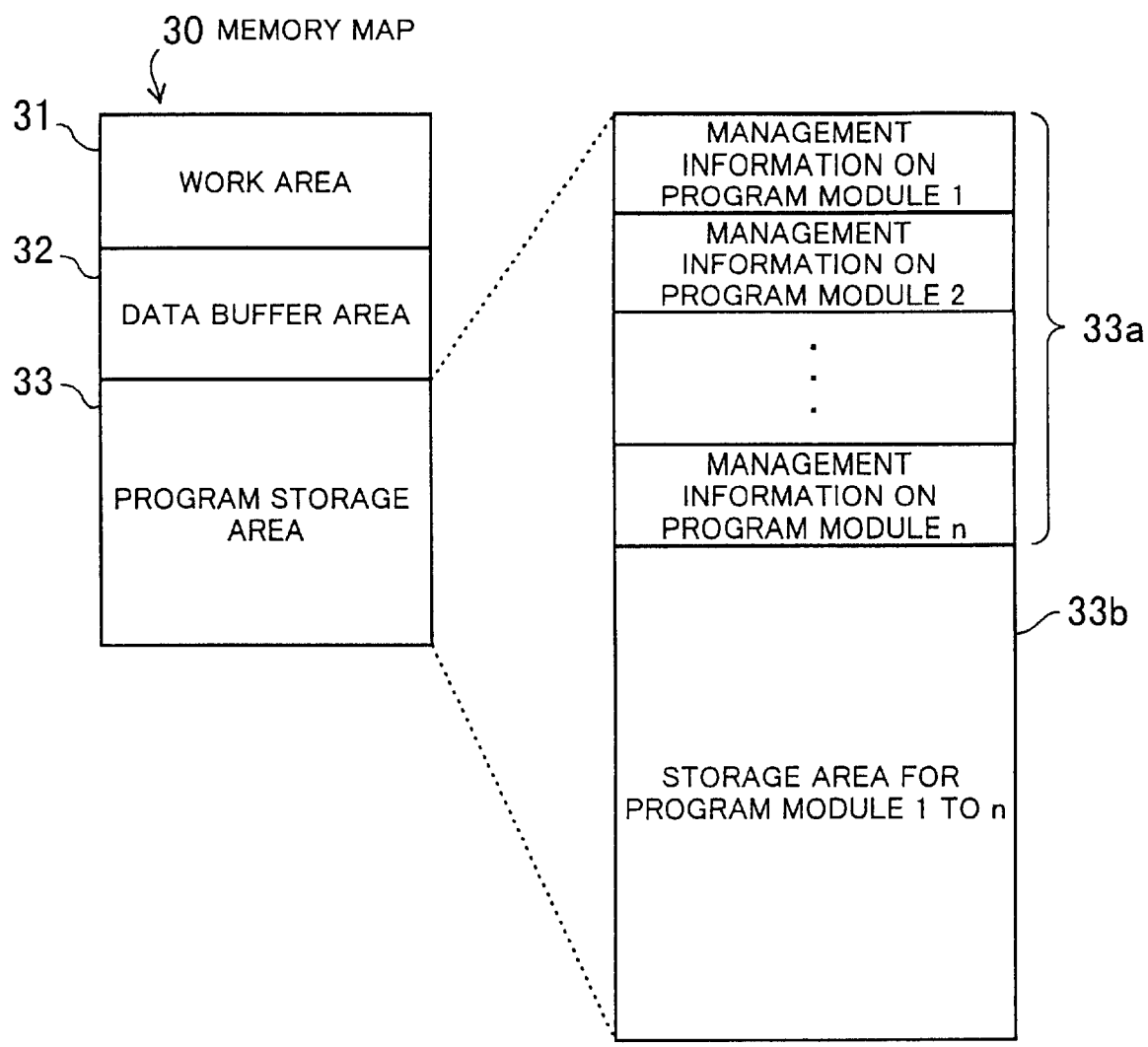
FIG. 5 is a diagram showing a memory map of a service providing system.

FIG. 5 shows a memory map of the service providing system 20. The memory map 30 includes a work area 31, a data buffer area 32, and a program storage area 33. The work area 31 is an area for temporarily storing information or data which the program execution section 22 uses in executing a program module. The data buffer area 32 is an area for temporarily storing data after reception or before transmission of the data. The program storage area 33 is an area allocated to the program storage section 21. The program storage area 33 is divided into a management information storage area 33a for storing management information items associated with the respective program modules, and a program module storage area 33b. The management information items stored in the management information storage area 33a each has one-to-one correspondence with a specific program module stored in the program module storage area 33b.

Figure 6:
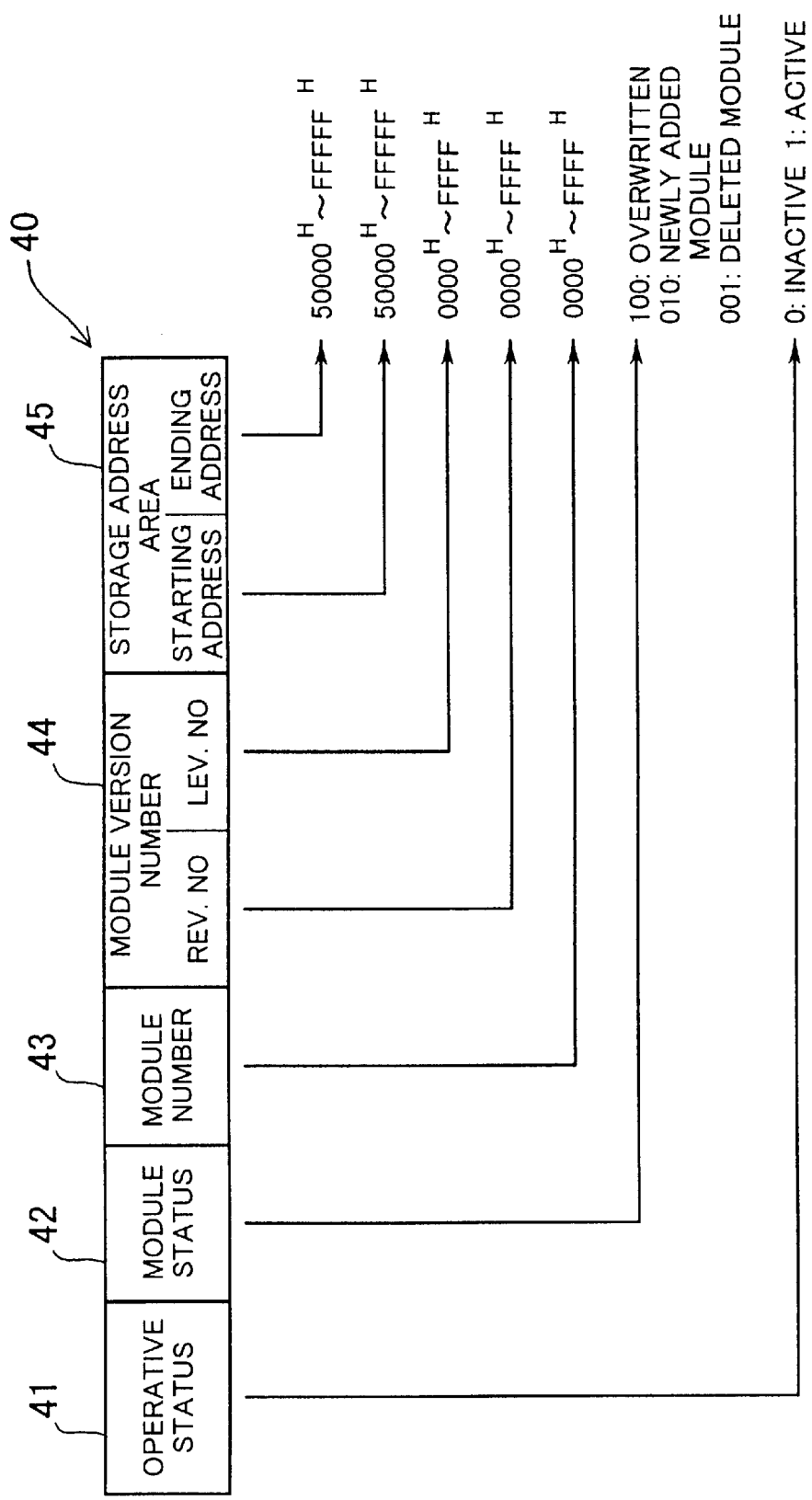
FIG. 6 is a diagram showing a data format of management information.

FIG. 6 shows the data format of a management information item. The management information item 40 includes operative status information 41, module status information 42, a module number 43, module version number information 44, and storage address area information 45.

The operative status information 41 is represented as a flag bit indicating whether a corresponding program module is active or inactive. If the flag assumes "0", it is indicated that the program module is inactive, whereas if the flag assumes "1", it is indicated that the program module is active.

The module status information 42 is represented as 3-bit data indicating whether the corresponding program module is overwritten, newly added, or already deleted. If the data has a value of "100", it is indicated that the program module has been overwritten, which means that it was upgraded at least once. If the data has a value of "010", it is indicated that the program module is a newly added one, and if the data has a value of "001", it is indicated that the program module is a deleted one. In the last case, the program module is not actually stored in the program storage section 21 but only a management information item associated therewith still remains.

The module number 43 is a unique number assigned to the corresponding program module for identification.

The module version number information 44 indicates a version number of the corresponding program module by a revision number (Rev. No) and a level number (Lev. No). When a relatively large modification, such as an addition of a function, is effected, the revision number is updated. On the other hand, when a small modification, such as correction of a defective condition, is carried out, the level number is updated.

In the storage address area information 45, there are stored a starting address and an ending address of an area in which the corresponding program module is stored.

Next, a routine for processing carried out by the system described above will be described.

Figure 7:
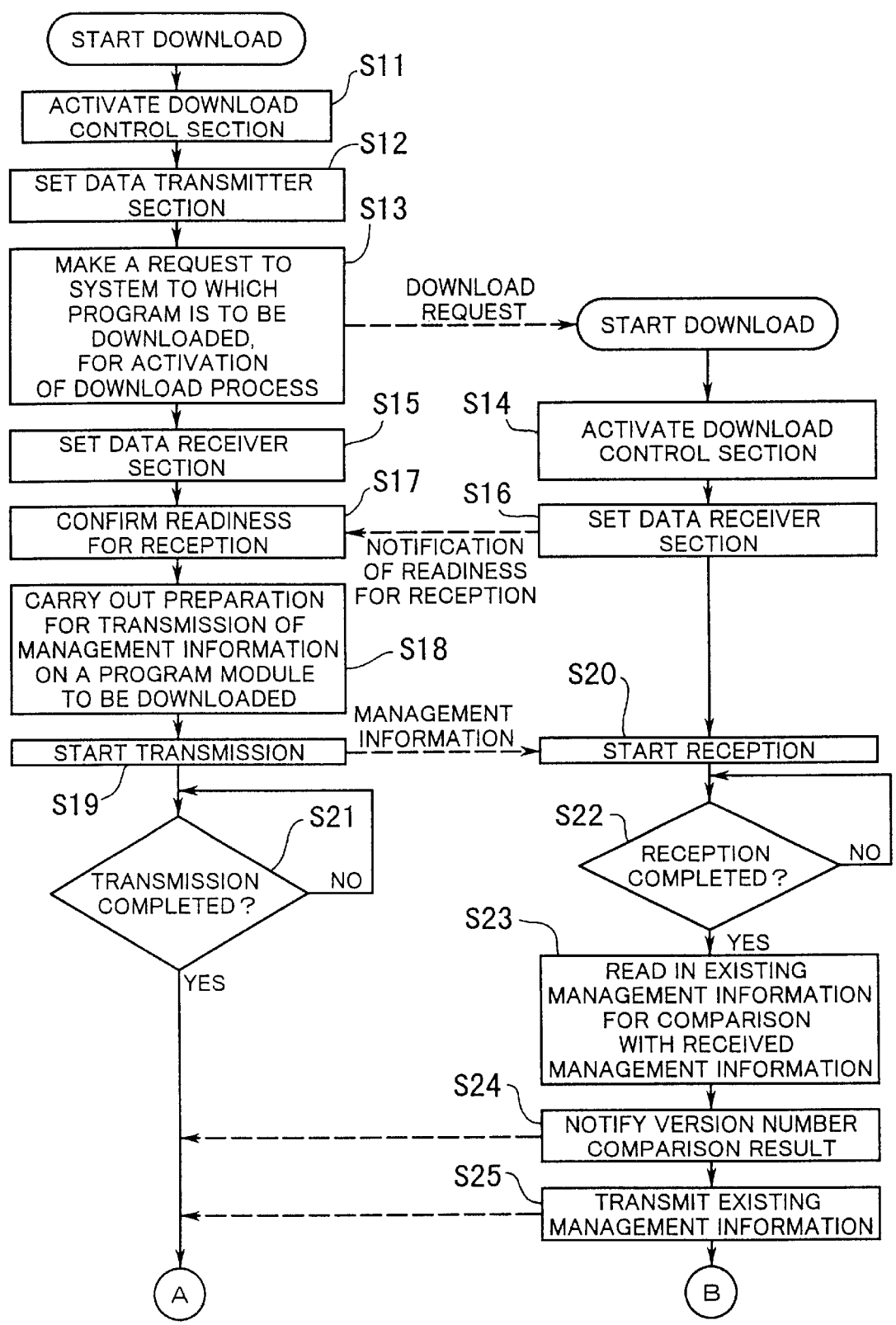
FIG. 7 is a first part of a flowchart showing a routine for program download.

FIG. 7 is a first part of a flowchart showing a routine for program download. Now, the flowchart is explained in order of step numbers. This routine is executed when a command is input to the system management system 10 to update the program stored in the service providing system 20 under its management.

(Step S11) The download control section 12 is activated.

(Step S12) The data transmitter section 14 is set for data transmission.

(Step S13) The download control section 12 delivers a request for starting download processing to the service providing system 20 to which the program should be downloaded.

(Step S14) The download control section 23 within the service providing system 20 is activated.

(Step S15) The data receiver section 13 is set for data reception.

(Step S16) The data receiver section 24 is set for data reception. When the setting of the section 24 is completed, notification of readiness for data reception is transmitted to the system management system 10.

(Step S17) The data receiver section 13 receives the notification of readiness for data reception and notifies the download control section 12 that the service providing system 20 is ready for data reception.

(Step S18) The download control section 12 extracts management information items associated with the respective program modules from the download program storage section 11, in preparation of transmission of them.

(Step S19) The data transmitter section 14 transmits the management information items associated with the respective program modules to the service providing system 20.

(Step S20) The data receiver section 24 starts data reception.

(Step S21) The data transmitter section 14 determines whether or not the data transmission is completed. This step S21 is repeated until the data transmitter section 14 determines that the data transmission is completed.

(Step S22) The data receiver section 24 determines whether or not the data reception is completed. This step S22 is repeated until the data receiver section 24 determines that the data reception is completed.

(Step S23) The version number comparison section 23*a* within the download control section 23 reads in the management information items associated with the respective program modules stored in the program storage section 21, for comparison with the management information items received from the system management system 10.

(Step S24) The download control section 23 determines based on a result of the version number comparison whether or not the received management information contains any newer version number than that of a corresponding program module stored in the program storage section 21, and notifies the system management system 10 of the version number check result.

(Step S25) The download control section 23 extracts the management information from the program storage section 21 and transmits the same to the system management system 10.

Figure 8:
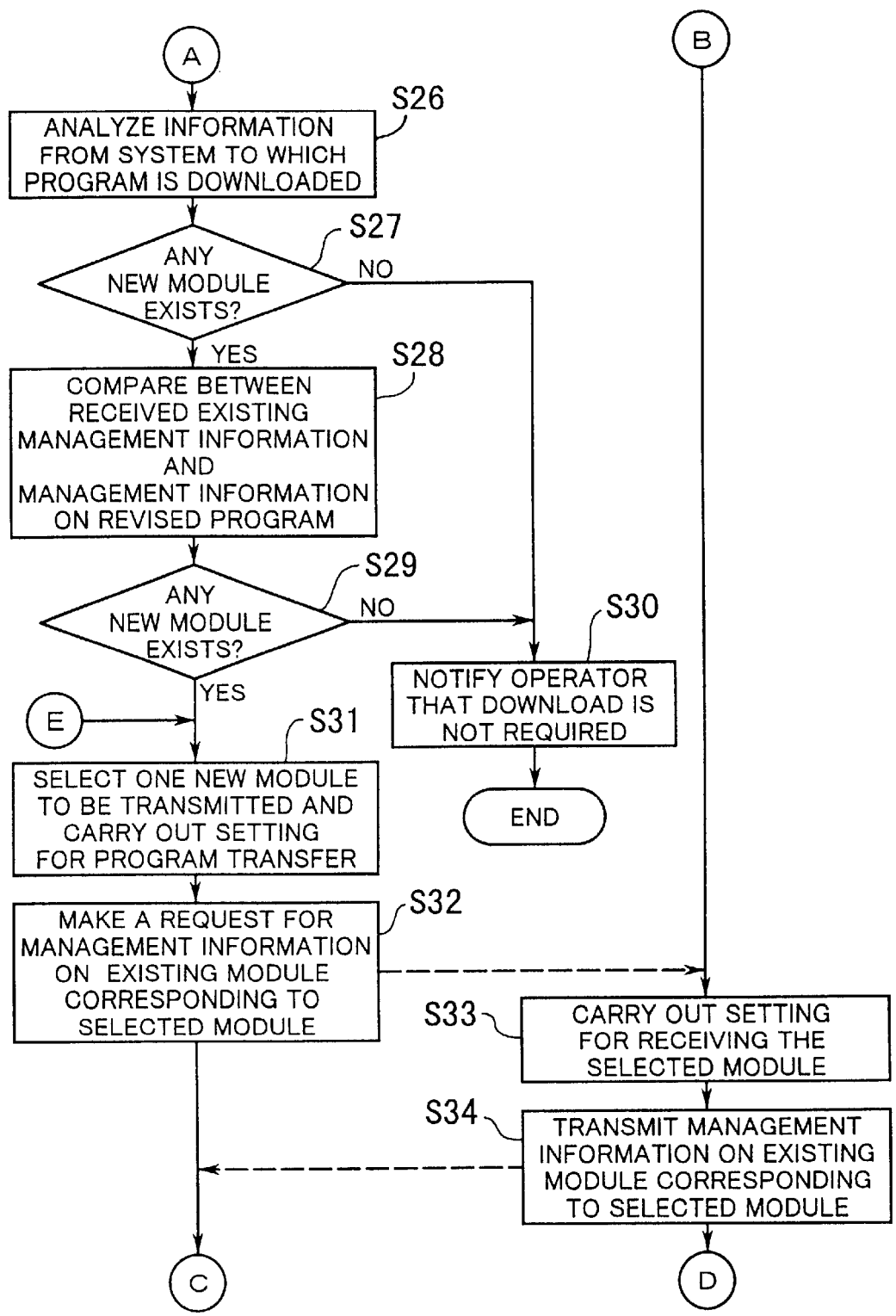
FIG. 8 is a second part of the flowchart showing the routine for program download.

FIG. 8 is a second part of the flowchart showing the routine for program download.

(Step S26) The download control section 12 analyzes the version number check result received from the service providing system 20.

(Step S27) The download control section 12 determines whether or not the check result shows there exists any new program module to be downloaded. If the check result shows that there is a new program module to be downloaded, the program proceeds to Step S28, and otherwise, the program proceeds to Step S30.

(Step S28) The version number comparison section 12*a* performs a comparison between the version number information items associated with the respective program modules in the service providing system 20, which are contained in the management information received from the service providing system 20, and the version number information items associated with the program modules, which are contained in the management information stored in the download program storage section 11.

(Step S29) The download control section 12 determines based on a result of the comparison whether or not there exists any new program module to be downloaded. If there is a new program module to be downloaded, the program proceeds to Step S31, and otherwise, the program proceeds to Step S30.

(Step S30) The download control section 12 displays on a screen of a terminal device used by the operator a message indicating that download is not required.

(Step S31) The download control section 12 selects a new program module which is not yet transmitted, and carries out setting for program transfer.

(Step S32) The download control section 12 sends a request to the service providing system 20, for sending a management information item associated with a program module corresponding to the selected program module.

(Step S33) The download control section 23 carries out setting for receiving the program module selected by the system management system 10.

(Step S34) The download control section 23 extracts from the program storage section 21 the management information item associated with the program module corresponding to the selected program module, and transmits the same to the system management system 10.

Figure 9:
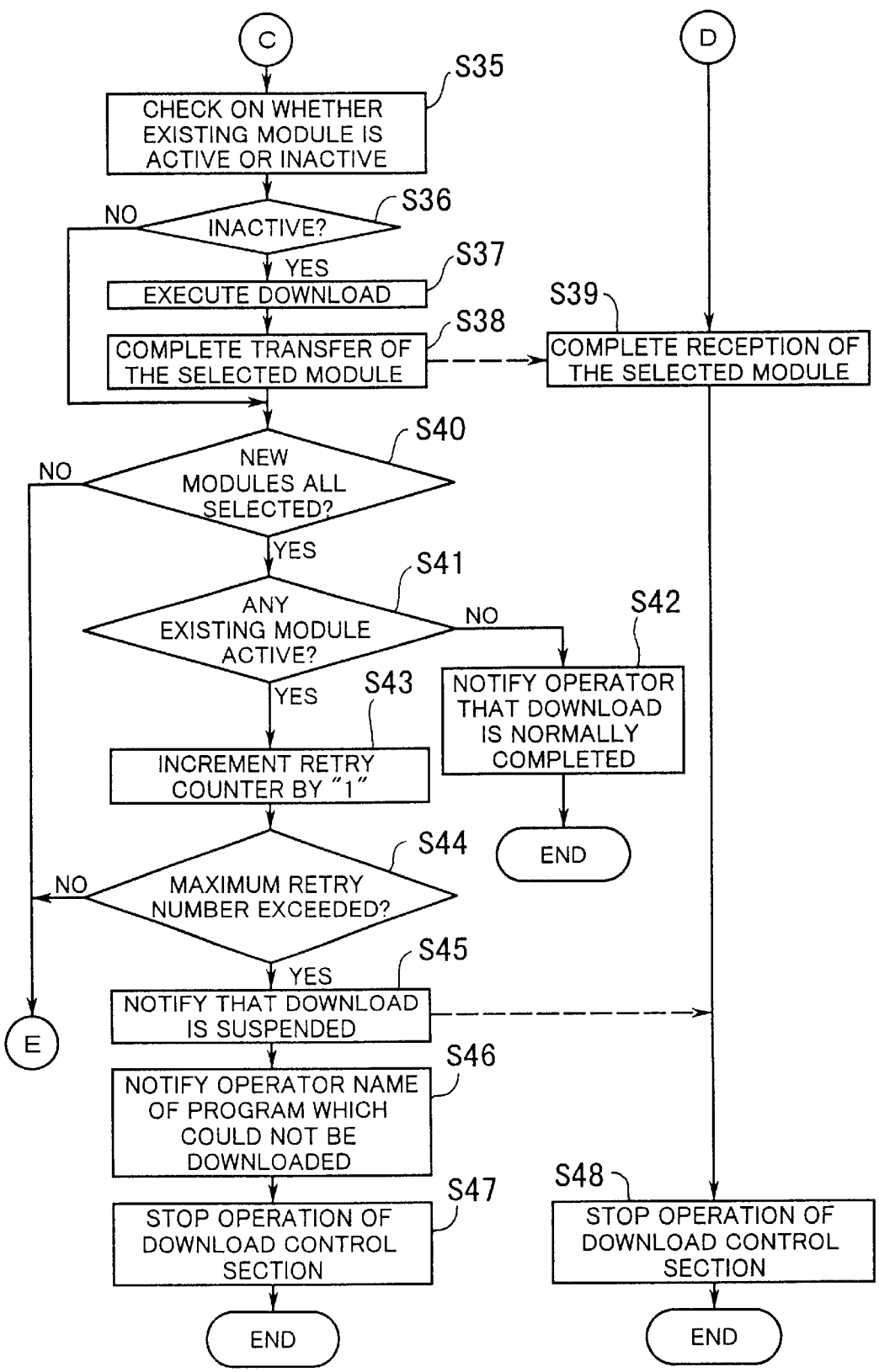
FIG. 9 is a third part of the flowchart showing the routine for program download.

FIG. 9 is a third part of the flowchart showing the routine for program download.

(Step S35) The download control section 12 performs a check on the operative status of the existing program module corresponding to the selected program module to be downloaded based on the management information item received from the service providing system 20.

(Step S36) The download control section 12 determines whether or not the check result shows the existing program module is inactive. If the existing program module is inactive, the program proceeds to Step S37, whereas if the existing program module is active, the program proceeds to Step S40.

(Step S37) The download control section 12 executes download of the selected program module.

(Step S38) The download control section 12 notifies the service providing system 20 that transfer of the selected program module is completed.

(Step S39) The download control section 23 completes reception of the selected program module.

(Step S40) The download control section 12 determines whether or not all of new program modules have been once selected for download. If all of the new program modules have been once selected, the present program proceeds to Step S41, and otherwise, the program returns to Step S31.

(Step S41) The download control section 12 determines whether or not there is any new program module which could not be downloaded since the corresponding existing program module in the service providing system 20 was active. If such a program module is found, the present program proceeds to Step S43, and otherwise, the program proceeds to Step S42.

(Step S42) The download control section 12 displays on the screen of the terminal device used by the operator a message indicating that the download has been normally completed.

(Step S43) The download control section 12 increments a retry counter by "1". The retry counter is set to "0" when the download control section 12 is activated. After the retry counter is incremented by "1", only the program modules which could not be downloaded due to the active status of the corresponding program modules are treated as new program modules to be downloaded.

(Step S44) The download control section 12 determines whether or not the count of the retry counter has exceeded the maximum retry number. If the maximum retry number is exceeded, the present program proceeds to Step S45, and otherwise, the program returns to Step S31.

(Step S45) The download control section 12 notifies the service providing system 20 that the download is suspended.

(Step S46) The download control section 12 displays on the screen of the terminal device the name of the program module which could not be downloaded.

(Step S47) The download control section 12 stops its operation to thereby terminate the present processing.

(Step S48) The download control section 23 stops its operation to thereby terminate the present processing.

As described above, the present invention makes it possible to update a program divided into modules, on a module-by-module basis, without stopping or interrupting services provided to users by operation of the program stored in the system.

Next, the present invention will be described in further detail based on an exemplified case in which the invention is applied to a system for providing infocommunications services. In order to carry out download of a program in operation, on line, it is required that all program modules except one being downloaded can be run during the program download. In the following example, the transfer of a program for download is realized through a DMA (direct memory access) control function.

Figure 10:
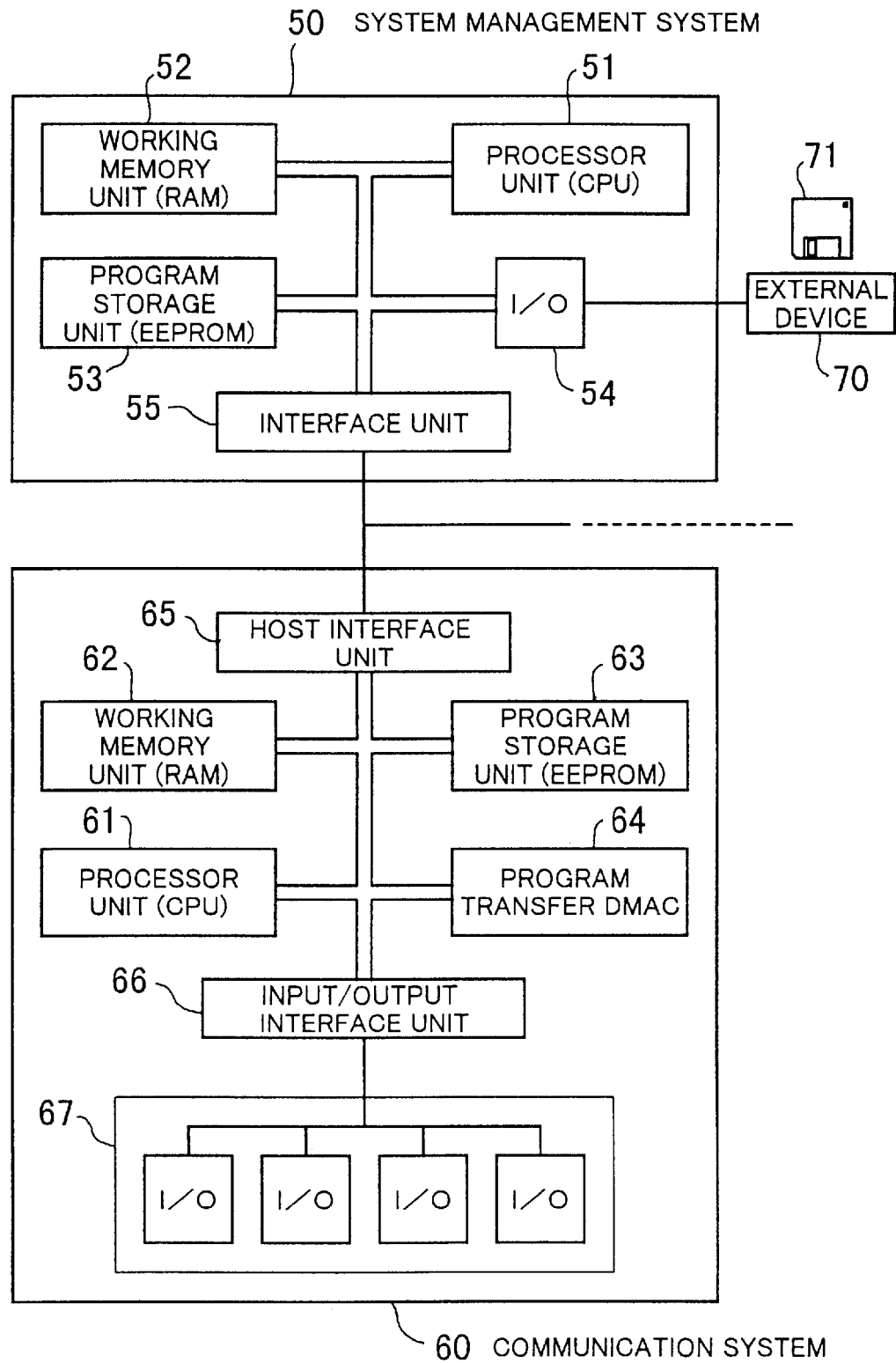
FIG. 10 is a block diagram showing an example of a hardware configuration of a communication system.

FIG. 10 shows an example of a hardware configuration of a communication system. In this example, a system management system 50 and a communication system 60 are connected to each other by an internal bus.

The system management system 50 is comprised of a processor unit 51 including a central processing unit (CPU) for controlling the whole system, a working memory unit (RAM: random access memory) 52 for loading a program to be executed by the processor unit 51, a program storage unit (EEPROM: electrically erasable and programmable ROM) 53 for storing a system program and so forth, an input/output (I/O) unit 54 to be connected to an external device 70, and an interface unit 55 to be connected to the internal bus. Devices used as the external device 70 include a floppy disk drive, and a newest program module is read from a floppy disk 71 mounted in the drive.

The communication system 60 is comprised of a processor unit 61 including a CPU for controlling the whole communication processing, a working memory unit (RAM) 62 for loading a program to be executed by the processor unit 61, a program storage section (EEPROM) 63 storing program modules corresponding to respective functions, a program transfer direct memory access controller (DMAC) 64 specially provided for transfer of a program, a host interface unit 65 for data transmission/reception carried out between the communication system 60 and the system management system 50 via the system bus, an input/output interface unit 66 for inputting and outputting communication data, and an input/output (I/O) unit 67 connected to external communication media.

Figure 11:
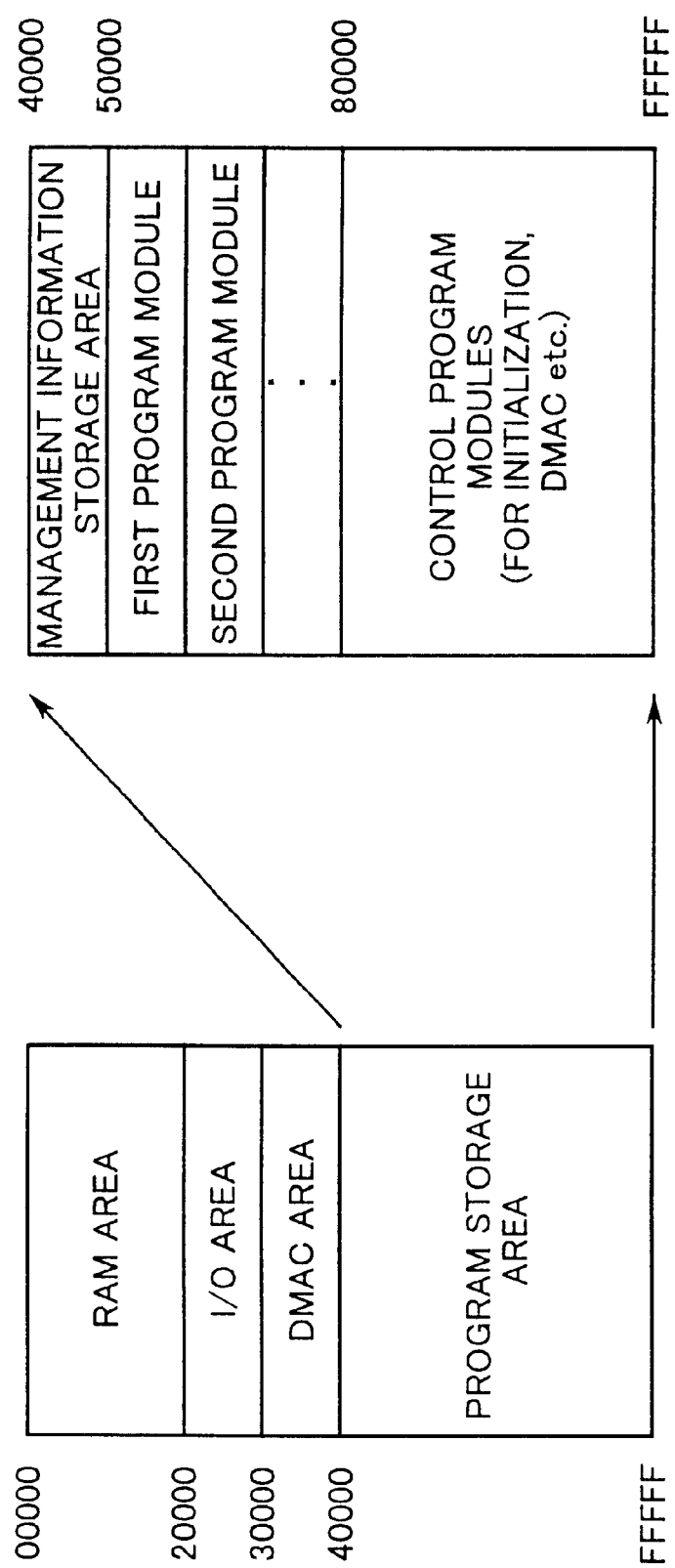
FIG. 11 is a diagram showing an address map of the communication system.

FIG. 11 shows an address map of the communication system. In the address map of the communication system 60, an address range "00000-1FFFF" is assigned to a RAM area, "20000-2FFFF" to an I/O area, "30000-3FFFF" to a DMAC area, and "40000-4FFFF" to a program storage area.

The program storage area is further divided into an address range "40000-4FFFF" assigned to a management information storage area, an address range "50000-7FFFF" assigned to a storage area storing program modules for providing various functions, respectively, and an address range "80000-FFFFF" assigned to a storage area storing the other program modules (e.g. for initialization, DMAC, etc.).

Figure 12:
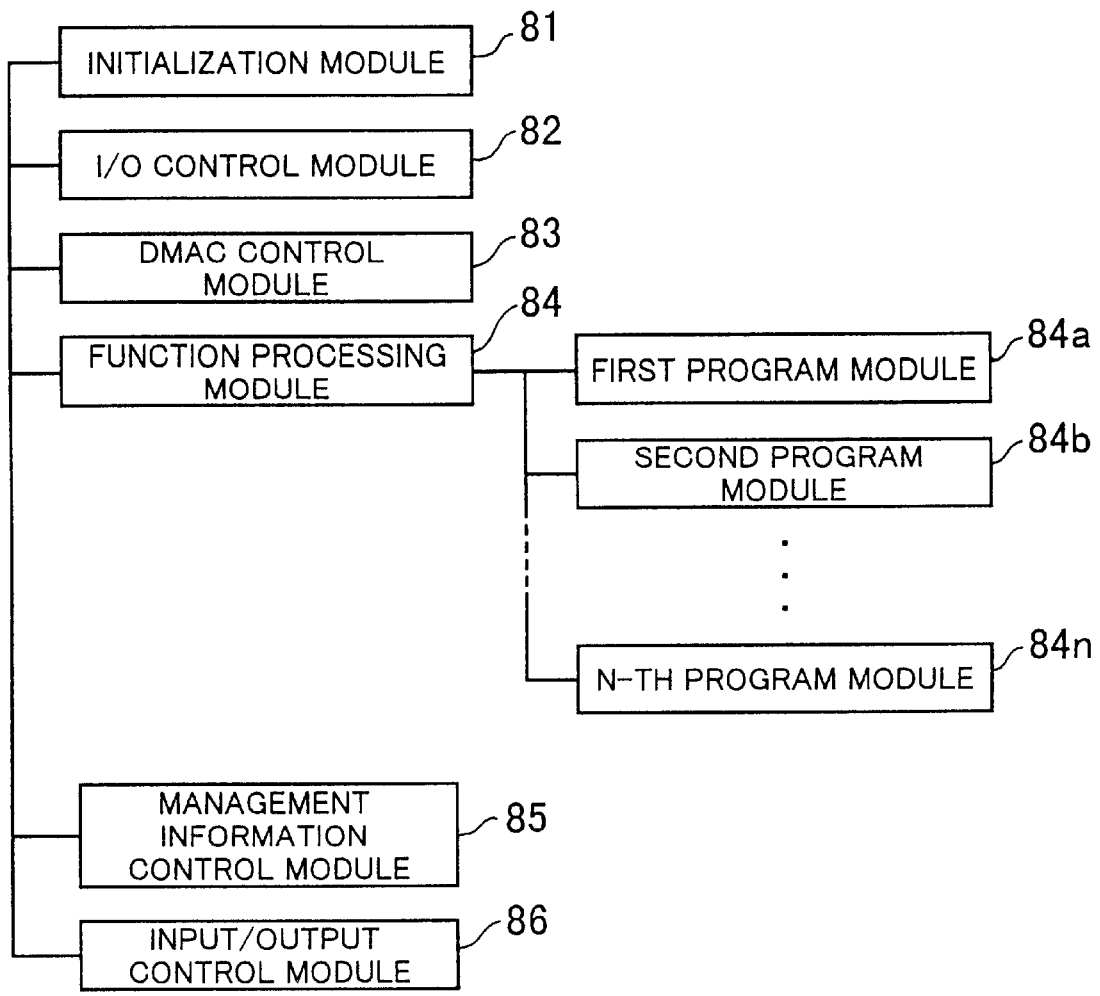
FIG. 12 is a diagram showing an example of construction of a program module group.

FIG. 12 shows an example of the construction of a program module group. The program storage section 63 of the communication system 60 stores the following program modules: an initialization module 81 for executing initialization when the communication system 60 is started up; an I/O control module 82 for controlling operation of the input/output unit 67; a DMAC control module 83 for controlling operation of the program transfer DMAC 64; a function processing module 84 for controlling communication functions made available for a user (the function processing module 84 is divided into a plurality of program modules 84a to 84n each having a different function); a management information control module 85 for controlling e.g. an update of management information; and an input/output control module 86 for controlling the host interface unit 65 and the input/output interface unit 66.

In the system constructed as above, management information is exchanged between the system from which the program is downloaded (system management system 50) and the system to which the program is downloaded (communication system 60). Then, at a time point the execution of program download is decided, setting of the program transfer DMAC 64 is carried out according to the sequence described below, and then transfer of the program is carried out.

Figure 13:
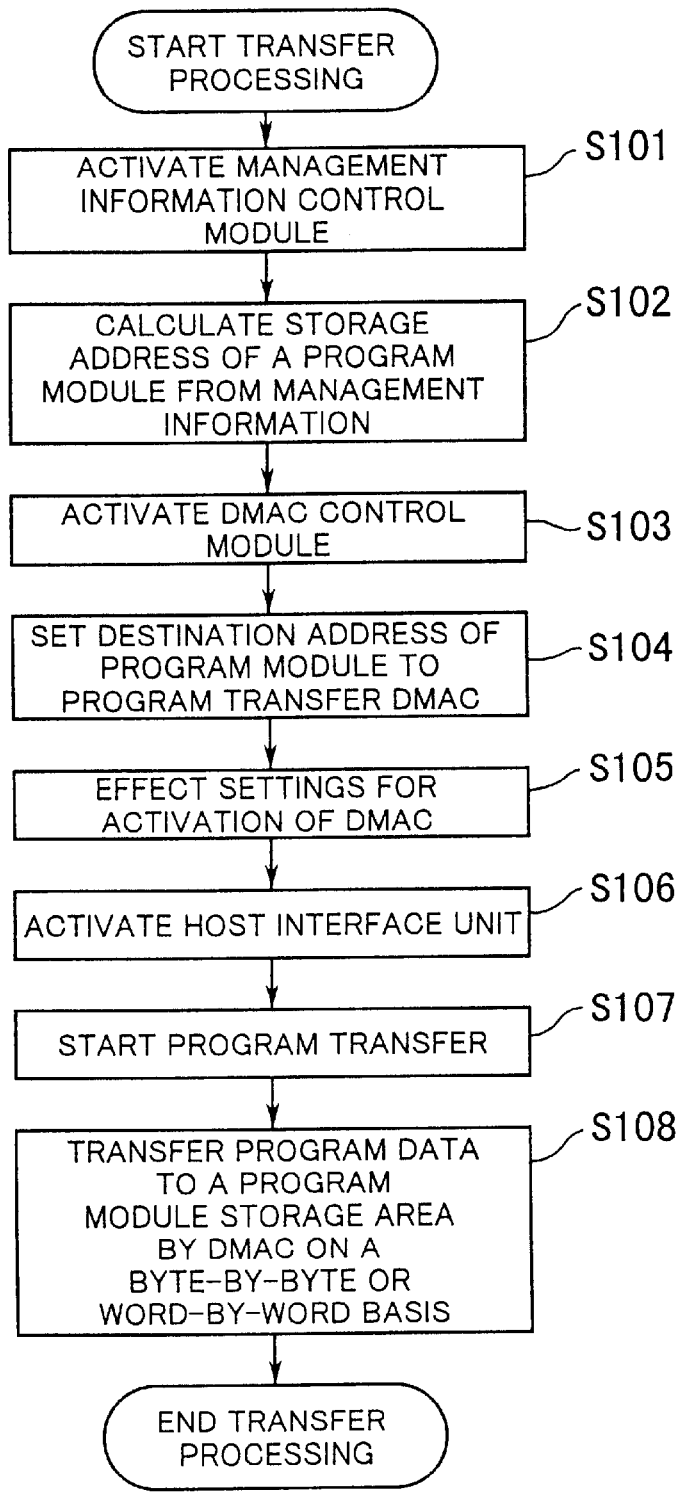
FIG. 13 is a flowchart showing a sequence of program download.

FIG. 13 shows the sequence of program download. This processing is carried out by the processor unit 61 through running a program stored in the program storage section 63 when a program transfer start notification which designates a specific program module to be downloaded Is received from the system management system 50 by the communication system 60. However, the DMA transfer (see Step S108) alone is carried out by the program transfer DMAC 64.

(Step S101) The management information control module 85 Is activated.

(Step S102) The storage addresses of a designated program module are determined by reading management information from the management information storage area within the program storage section 63.

(Step S103) The DMAC control module 83 is activated.

(Step S104) Destination addresses of a location to which the program module should be transferred and an amount of data to be transferred for the download of the program module are set to the program transfer DMAC 64.

(Step S105) Settings are effected for activation of the program transfer DMAC 64.

(Step S106) The host interface unit 65 is activated.

(Step S107) The DMA transfer of the program module from the system management system 50 via the host interface unit 65 is started.

(Step S108) The program transfer DMAC 64 transfers program data to a storage area for storing the program module, on a byte-by-byte or word-by-word basis.

Figure 14:
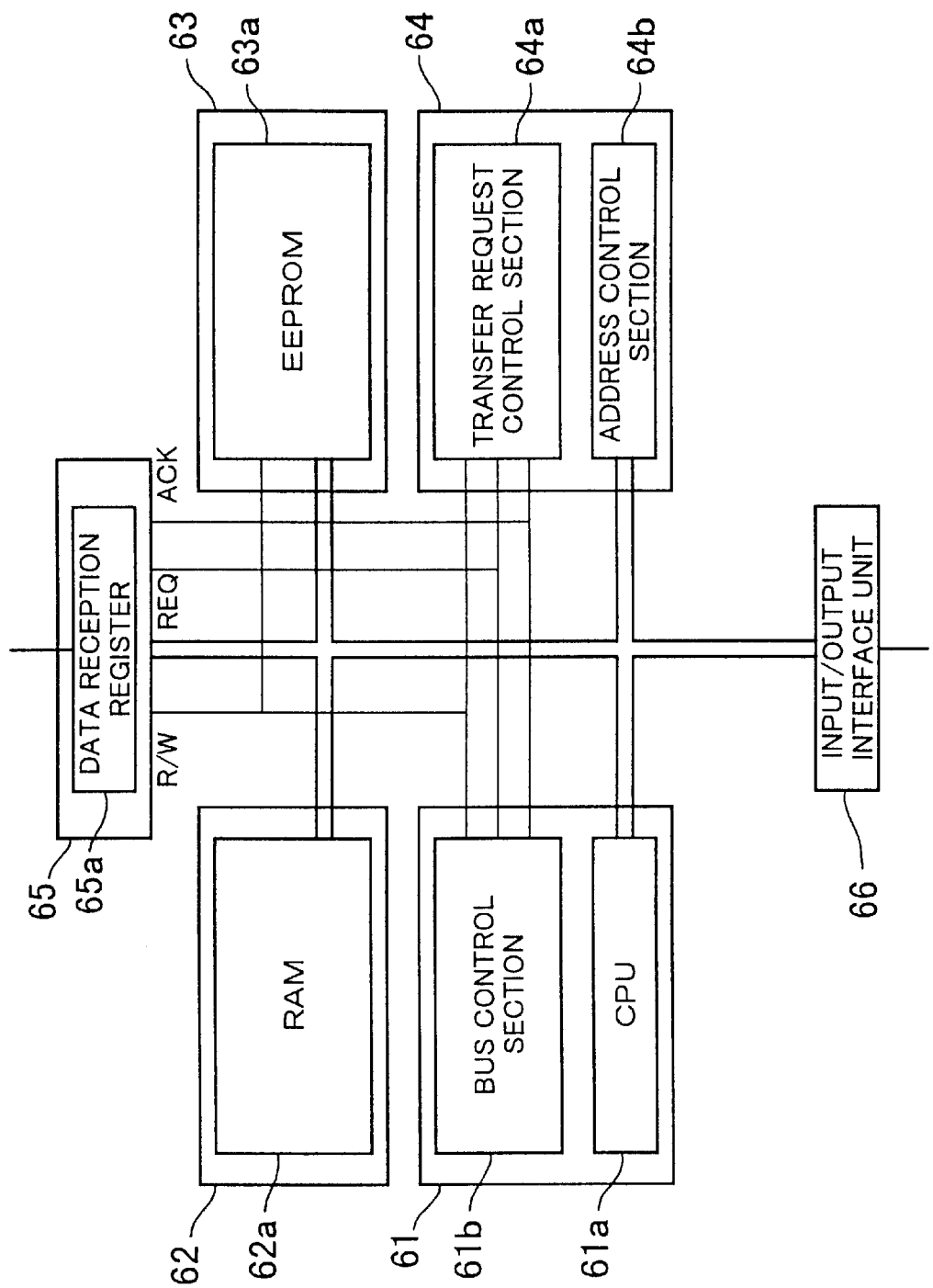
FIG. 14 is a block diagram which is useful in explaining a mechanism of program transfer performed by a DMAC.

FIG. 14 shows a transfer mechanism of the DMAC for transferring a program module. FIG. 14 also shows the internal construction of each component essential to the DMA transfer. The processor unit 61 includes a CPU 61*a* and a bus control section 61*b*. The working memory unit 62 is comprised of a RAM 62*a*. The program storage section 63 is comprised of an EEPROM 63*a*. The program transfer DMAC 64 includes a transfer request control section 64*a* and an address control section 64*b*.

Figure 15:
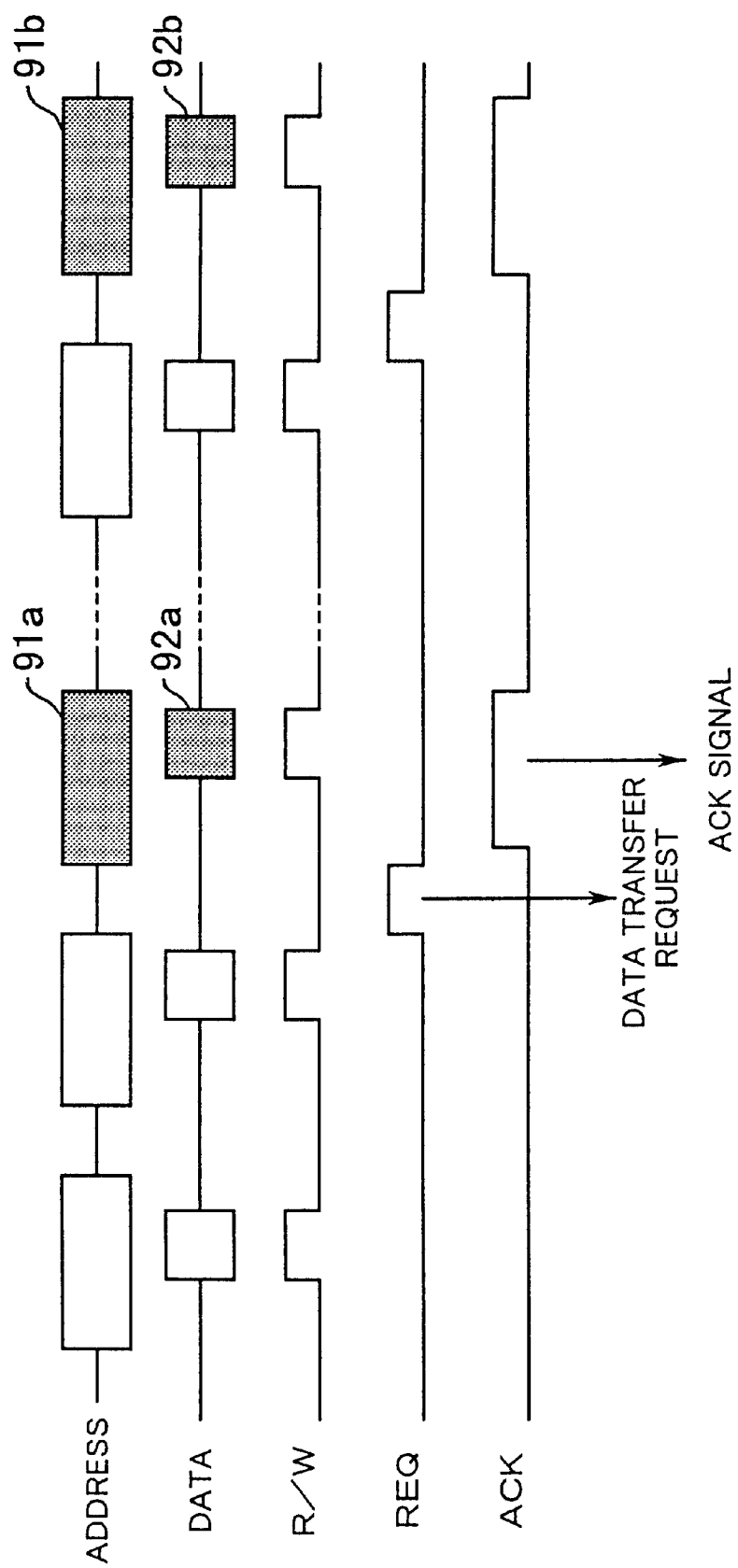
FIG. 15 is a timing chart showing an example of DMA transfer.

FIG. 15 is a timing chart which is useful for explaining a DMA transfer. When program data of a program module transferred from the system management system 50 is inputted to a data reception register 65*a* of the host interface unit 65, the host interface unit 65 delivers a data transfer request (REQ signal) requesting transfer of the program data to the program storage section 63, to the program transfer DMAC 64 and the CPU 61*a*. The processor unit 61 outputs an ACK signal (i.e. a signal permitting the DMA transfer) from the bus control section 61*b* to the program transfer DMAC 64 at suitable timing during a time period over which the CPU 61*a* is executing a program module other than one for processing associated with the download. The transfer request control section 64*a* of the program transfer DMAC 64 is responsive to the ACK signal, for outputting a write signal (when the output (R/W signal) from the transfer control section 14*a* is at a high level, it is a write signal, and when the same is at a low level, it is a read signal) to an R/W signal line, and the address control section 64*b* outputs addresses 91*a*, 91*b* of locations at which downloaded data is to be stored, only during a time period over which the ACK signal is outputted. This causes data items 92*a*, 92*b* stored in the data reception register 65*a* to be transferred to a predetermined program module storage area without involving the CPU 61*a*, but directly.

The execution of the operation described above on a module-by-module basis makes it possible to download a predetermined program module on line without stopping or interrupting service operation of the system. During checking on management information at the start of a program transfer, whether or not download of the predetermined program module is permitted is checked by an operative status flag in a management information item associated with the program module. If the operative status flag indicates an "active" status of the program module, a next management information item associated with the following program module is checked on. Program transfer is started when an operative status flag associated with a program module to be updated indicates an "inactive" status of the program module.

The above system provides the following advantageous effects:

Firstly, a program can be updated without stopping or interrupting operation of a system or a device providing online services, which eliminates adverse effects of program download on the services provided to users. As a result, program update, which is conventionally executed only on a holiday or during a time period over which the minimum amount of service is required, can be carried out at any time, thereby enabling efficient maintenance of the system or the device.

Secondly, it is possible to always automatically detect the correct version number of a program module which should be downloaded to a system on which a program including a previous version of the program module is running. This prevents erroneous download of a wrong program module. As a result, it is possible to prevent recurrence of a defect which should have already been eliminated and hindrance of improvement of functions, due to download of an older version, whereby it is possible to enhance reliability of the system or the device.

Thirdly, the version number of a program is managed on a module-by-module basis, and only when the version number of an existing program module is judged to be older, a revised program module corresponding to the existing program module is downloaded, so that it is possible to minimize the volume of program modules to be downloaded, which contributes to reduction of a time period required for program download and a time period required for starting up of the system or device.

It should be noted that the system management system and the service providing system according to the above embodiment may be connected to each other by a high speed bus or by a network. When a network is utilized, it is possible to download a program from a distant location.

Further, the above processing capabilities can be implemented by a computer. In this case, details of processing which can be executed by functions of the system management system or the service providing system are written in a program stored in a computer-readable recording medium, and the processing capabilities are realized by executing the program on the computer. The computer-readable recording media include a magnetic recording medium, and a semiconductor memory. In order to make this program available on the market, it can be stored in a portable recording medium, such as a compact disk read only memory (CD-ROM) or a floppy disk. Further, the program can be stored in a storage device of a computer connected to a network, and transferred to other computers via the network. When the program is executed on a computer, the program stored in a hard disk or the like within the computer is loaded into a main memory for execution.

As described above, according to the online program-updating system of the present invention, it is possible to check on an operative status flag indicative of the operative status of an existing program module to be updated, to thereby execute program download when the existing program module is inactive or not being run. Therefore, the existing program module can be updated during execution of other program modules, without stopping or interrupting operation of the whole system.

Further, in the computer-readable recording medium storing a program-updating program, according to the present invention, it is possible to set an operative status flag indicative of the operative status of an existing program module to be updated, and cause a computer to execute program download when the existing program module is inactive or not being run. Therefore, the existing program module can be updated without stopping or interrupting operation of the whole system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer system for updating contents of a program module by downloading to a computer a revised program module on line, the computer system comprising:

program storage unit for storing an existing program module to be updated;

management information storage unit for storing management information including an operative status flag indicative of an operative status of said existing program module;

program execution unit for executing said existing program module as required and setting said operative status flag to a state indicative of an active status of said existing program module during execution of said existing program module;

operative status determination unit for repeatedly determining whether or not said operative status flag is set to said status indicative of said active status of said existing program module in response to a download request and permitting execution of a download process only when said operative status flag is not set to said operative status indicative of said active status of said existing program module to be updated; and program transfer unit for downloading a revised program module during a time period over which said download process is permitted by said operative status determination unit, to thereby replace said existing program module stored in said program storage unit with said revised program module.

2. The computer system according to claim 1, wherein said existing program module stored in said program storage unit is formed of a plurality of program modules, said management information stored in said management information storage unit being provided individually for each of said program modules of the plurality, and said operative status determination unit determining whether or not said download process is permitted, on a module-by-module basis.

3. The computer system according to claim 2, wherein said operative status determination unit simultaneously determines on said plurality of program modules as to whether or not said download process is permitted, and said program transfer unit downloading any one of said program modules of the plurality for which said download process is permitted by said operative status determination unit, and thereafter repeatedly carrying out said determination by said operative status determination unit on ones of said program modules for which said download process was not permitted previously, whether or not said download process is permitted, thereby executing said download process in order in which said download process is permitted.

4. The computer system according to claim 1, wherein said management information stored in said management information storage unit includes information of a version number of said existing program module, said computer system further including a version number check unit for performing a comparison between said information of said version number of said existing program module and information of a version number of said revised program module in response to said download request for said download process of said revised program module, to thereby determine whether or not an update of said existing program module is required, and said program transfer unit executing said download process of said revised program module only when it is determined by said version number check unit that said update of said existing program module is required, and updating said information of said version number of said existing program module to said information of said version number of said revised program module when said download process of said revised program module is executed.

5. The computer system according to claim 4, wherein said version number check unit is provided in both a system management system for transferring said revised program module therefrom and a processing system in which said program storage unit is located, and wherein said program transfer unit executes said download process of said revised program module only when said version number check unit provided in said system management system and said processing system both determine that said update of said existing program module is required.

6. The computer system according to claim 4, wherein said version number check unit determines that said update of said existing program module is required, only when said information of said version number of said revised program module is newer than said information of said version number of said existing program module.

7. The computer system according to claim 4, wherein said existing program module stored in said program storage unit is formed of a plurality of program modules, said management information stored in said management information storage unit being provided individually for each of said program modules of the plurality, said version number check unit checking on said information of said version number on a module-by-module basis, and said operative status determination unit determining whether or not said download process is permitted, on a module-by-module basis.

8. The computer system according to claim 7, wherein said management information storage unit stores items of said management information associated with said plurality of program modules at respective contiguous addresses, and wherein said version number check unit reads out said items of said management information associated with said plurality of program modules collectively from said management information storage unit, to thereby check on version numbers of said plurality of program modules on a module-by-module basis.

9. The computer system according to claim 1, wherein said program transfer unit replaces said existing program module stored in said program storage unit with said revised program module by direct memory access.

10. A computer-readable recording medium storing a program-updating program for updating contents of a program module by downloading a revised program module on line, said program-updating program causing a computer to function as:

program storage unit for storing an existing program module to be updated;

management information storage unit for storing management information including an operative status flag indicative of an operative status of said existing program module;

program execution unit for executing said existing program module as required and setting said operative status flag to a state indicative of an active status of said existing program module during execution of said existing program module;

operative status determination unit for repeatedly determining whether or not said operative status flag is set to said status indicative of said active status of said existing program module in response to a download request and permitting execution of a download process only when said operative status flag is not set to said operative status indicative of said active status of said existing program module to be updated; and program transfer unit for downloading a revised program module during a time period over which said download process is permitted by said operative status determination unit, to thereby replace said existing program module stored in said program storage unit with said revised program module.

* * * * *